(No Model.)
D. M. HEMINGWAY.
Flood Gate.
No. 236,585. Patented Jan. 11, 1881.
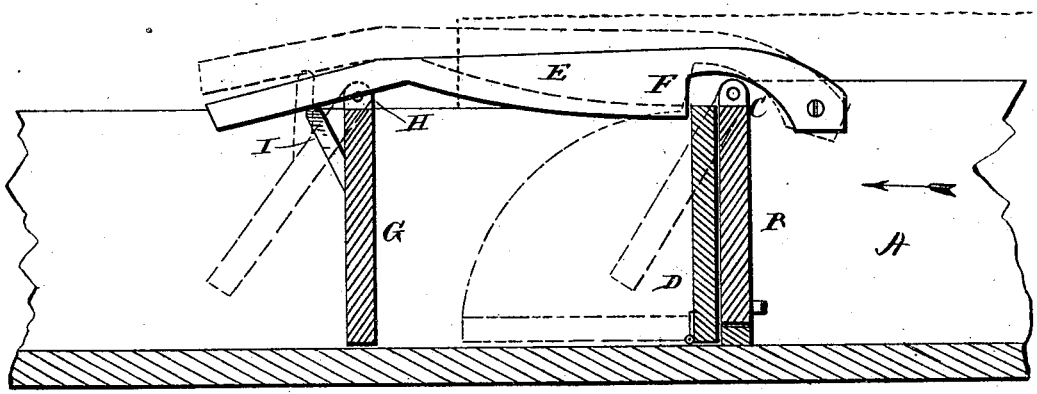
Witnesses,
Franck L. Ourand
J. J. McCarthy
Inventor
D. M. Hemingway
By Alexander & Mason
Attys.
—per T

UNITED STATES PATENT OFFICE.

DAVID M. HEMINGWAY, OF NEW PORT, MISSISSIPPI.

FLOOD-GATE.

SPECIFICATION forming part of Letters Patent No. 236,585, dated January 11, 1881.

Application filed July 21, 1880. (No model.)

*To all whom it may concern:*

Be it known that I, DAVID M. HEMINGWAY, of New Port, in the county of Attala, and in the State of Mississippi, have invented certain new and useful Improvements in Flood-Gates; and I do hereby declare that the following is a full, clear, and exact description thereof, reference being had to the accompanying drawing, and to the letters of reference marked thereon, making a part of this specification.

This invention relates to certain improvements in flood-gates for mill-races and other purposes; and it has for its object to provide for automatically operating the gates by means of the water in the race when a certain volume is exceeded, as more fully hereinafter described, to relieve the pressure and prevent injury. These objects I accomplish by the mechanism illustrated in the accompanying drawing, which represents a sectional view of my improved flood-gate.

The letter A indicates the mill race or chute, which is built or constructed in the ordinary manner.

B indicates a gate pivoted at its upper ends within the race or chute, as indicated at C; and D, a gate hinged at its lower edge to the bottom of the race or chute, and adapted to set against the gate B when elevated.

The letter E indicates two levers, pivoted one to each side of the race or chute, and provided with shoulders F, adapted to set over and engage the upper edge of the gate D when it is elevated and hold the same in an elevated position.

The letter G indicates a gate pivoted at its upper corners, H, to the mill race or chute, and located some distance ahead of the gates C and D. The said gate G is provided at its forward upper edge with lugs or ears I, which set under the forward ends of the levers F, and serve to elevate the same when the said gate is pressed forward by an unusual weight of water.

The operation of my invention will be readily understood in connection with the above description.

The water, when the parts of the apparatus are in normal position, flows over the upper edges of the gates B and D and under the gate G on its course through the race.

When the gate G meets with an unusual weight of water, accumulated from above in the mill race or chute, it will be pressed forward, raising the levers and permitting the gates C and D to open so as to give a free passage to the water, and thus relieve pressure and prevent injury to the race or chute and the gates and other parts of the same.

Having thus described my invention, what I claim, and desire to secure by Letters Patent, is—

The combination of the pivoted and hinged gates, adapted to operate together as described, with the shouldered levers and the forward pivoted gate provided with lugs or ears adapted to operate the levers to release the first-mentioned gates, substantially as and for the purposes specified.

In testimony that I claim the foregoing I have hereunto set my hand this 10th day of July, 1880.

DAVID M. HEMINGWAY.

Witnesses:
J. J. MCCARTHY,
JNO. T. MADDOCK.